Figure 1:
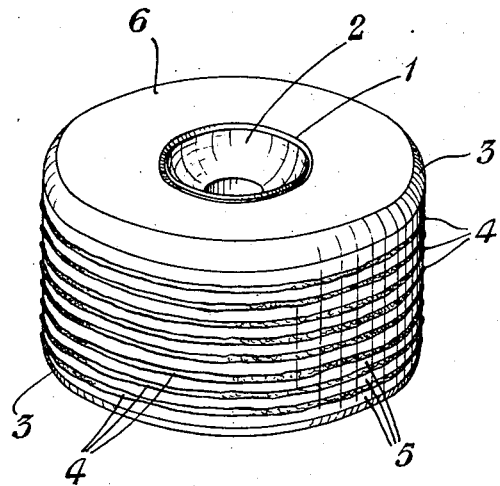

Oct. 18, 1949.  E. S. MARSH  2,485,304
WHEEL FOR ROLLER SKATES AND THE LIKE
Filed June 29, 1948

Inventor
Edward Samuel Marsh
By
Munn, Liddy & Glaccum
Attorneys

Patented Oct. 18, 1949

2,485,304

UNITED STATES PATENT OFFICE 2,485,304

WHEEL FOR ROLLER SKATES AND THE LIKE

Edward Samuel Marsh, Watford, England

Application June 29, 1948, Serial No. 35,890
In Great Britain October 23, 1947

6 Claims. (Cl. 301—5.3)

This invention relates to improvements in the construction and composition of wheels and is especially concerned with the provision of wheels for roller skates.

Wheels for roller skates should be tough to withstand wear, have good non-slip properties and be as silent as possible in use, furthermore undue drag should be avoided.

The present inventor has tried many materials and combinations of materials in experiments to improve silence and efficiency of roller skate wheels, however up to the present all suffered from one or more disadvantages. For example: All steel wheels are noisy and tend to slip, all rubber wheels give too much drag, all wood wheels tend to wear unevenly and develop slip while all vulcanite wheels though more silent than metal also tended to slip. So far as combinations of materials are concerned, it was found that rubber and wood laminations could not be satisfactorily bonded and the use of screws or pins tended to cause splintering along the grain of the wood, wood and vulcanite laminations were also difficult to bond and gave too low a coefficient of friction, wheels formed of rubber and metal laminations were found to damage the floor.

A successful solution was finally obtained and forms the subject matter of the present invention.

Wheels according to the invention are made of laminated material composed of alternate layers of rubber, and fabric impregnated with synthetic resin. For wheels of from $7/8''$ to $1\frac{1}{8}''$ in width at least 5 layers of rubber and at least 6 layers of resin impregnated fabric are necessary but for wheels of the above width the number of layers of rubber should not exceed 10 and the layers of resin impregnated fabric should not exceed 11, for satisfactory results.

The outer layers, which form the side surfaces of the wheels, are of double thickness impregnated material, or a double layer of impregnated material of standard thickness may be used for this purpose. These outer layers are radiused around their outer edges to prevent splitting and undue wear.

The material of the inside layers and of the outer layers may be the same, namely, coarse simple weave asbestos thread cloth impregnated with thermo-setting synthetic resin, but it has been found in practice that slightly better results are obtained if resin impregnated asbestos fibre board is used for the outer layers.

Where less than 5 layers of rubber are used the width of the rubber layers in contact with the floor is found to produce excessive drag. And where more than 10 layers of rubber are used the thinness of the fabric layers is such that they do not have the necessary robustness to support the rubber.

Wheels of the desired size are trepanned from sheets of the laminated material and are drilled to receive standard hub fittings which are pressed in.

Figure 2:
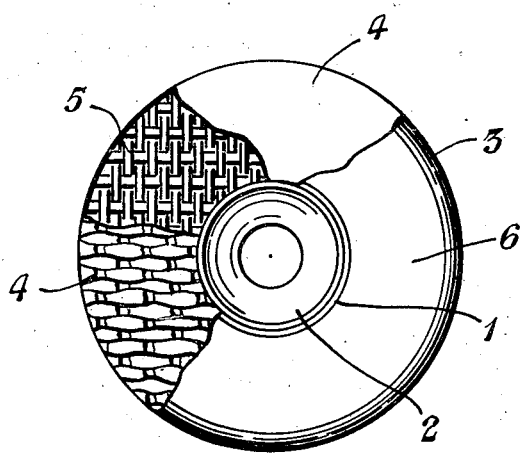

The above and other parts of the invention are embodied in a roller skate wheel constructed in accordance with the invention which will now be described with reference to the accompanying drawings in which Fig. 1 is a perspective view of a complete wheel, Fig. 2 is a plan view of a wheel with parts cut away to expose intermediate layers.

This form of wheel is $2\frac{1}{16}''$ in diameter and $1''$ in width (as a rule wheels of from $1\frac{7}{8}''$ to $2\frac{3}{16}''$ diameter are practical for skates). It is drilled with a $7/8''$ hole 1 at the centre to take a standard steel hub fitting 2 which is pressed in. The edges 3 of the wheel are rounded off with a radius of some $1/4''$, which is found to be effective in preventing undue wear at the edges with a wheel of this size.

There are eight laminations 4 of rubber and seven layers 5 of course weave asbestos fabric impregnated with thermo-setting synthetic resin in the material of the body of the wheel. The asbestos fabric used for these intermediate layers has seven to ten threads to the inch, the threads being woven in a simple warp and weft. The layers of each kind are arranged alternately and the outer layers 6 which are of similar impregnated fabric or preferably of resin impregnated asbestos fibre boards, are each double in width of those in the middle of the material. The double thickness of the outer layers may be achieved by using two sheets of fabric in place of the normal one, or by using a fabric of twice the normal thickness, though as stated above the preferred material is resin impregnated asbestos fibre board.

The finished wheel presents hard and glossy flat side surfaces of good appearance and a rolling surface roughly striped where the alternate layers of rubber and fabric are exposed. As machined the rubber laminations project very slightly proud of the fabric and this relationship is maintained in wear.

It is thought that the action of such a wheel during the act of skating is as follows: When pure rolling is taking place the slightly projecting parts of the rubber laminations are pressed back between the hard fabric laminations which then carry most of the load, consequently little drag is produced; when side thrust is applied however, as in cornering, there is a tendency to pull the rubber for the time being in contact with the floor slightly out from between the hard laminations thus increasing the grip of the wheel and preventing side slip.

I claim:

1. A roller skate wheel constructed of closely bonded laminated material comprising alternate layers of rubber and fabric impregnated with thermo-setting synthetic resin of which latter material the outer layers are composed.

2. A roller skate wheel according to claim 1 having between five and ten layers of rubber alternately arranged with between six and eleven layers of impregnated fabric.

3. A roller skate wheel constructed of closely bonded laminated material comprising between five and ten layers of rubber arranged alternately with between six and eleven layers of fabric impregnated with thermo-setting synthetic resin, the outer layers of the material being of the said impregnated fabric and twice the thickness of the inner layers.

4. A roller skate wheel according to claim 3 in which the said impregnated fabric is composed of asbestos.

5. A roller skate wheel according to claim 3 in which the said impregnated fabric is composed of coarsely woven asbestos thread cloth.

6. A roller skate wheel according to claim 3 in which the said impregnated fabric of the outer layers is asbestos fibre board and the said impregnated fabric of the inner layers is coarsely woven asbestos thread cloth.

EDWARD SAMUEL MARSH.

REFERENCES CITED

The following references are of record in the file of this patent:

UNITED STATES PATENTS

| Number | Name | Date |
|---|---|---|
| 339,382 | Colburn | Apr. 6, 1886 |
| 1,532,977 | Atwood | Apr. 7, 1925 |
| 1,687,113 | Stockdale | Oct. 9, 1928 |